Patented June 4, 1940

2,203,180

UNITED STATES PATENT OFFICE 2,203,180

HEATING OF BAKERS' AND LIKE OVENS

John Edward Pointon and Claude Dumbleton, Peterborough, England, assignors to Baker Perkins Incorporated, Saginaw, Mich.

Application February 12, 1940, Serial No. 318,454
In Great Britain December 16, 1938

1 Claim.  (Cl. 107—63)

This invention relates to heating means for bakers' and like ovens, more particularly of the swinging tray or conveyor type, and has for its object the provision of an improved oven heating arrangement suitable for affording alternative modes of heating as may be selected by the purchaser or to enable him to change the installation from one heat source to another as may be rendered necessary or desirable by circumstances. For example, according to the invention the oven is provided with means whereby solid fuel such as coke or coal or pulverised fuel may be used or, if such be not available, the oven can be changed over to or substituted by oil or gas burner source of heat.

The invention consists in a bakers' or like oven wherein the baking chamber is heated by Perkins steam tubes or like elongated heat-conductive radiating elements which are heated by combustion gases circulated through a substantially closed circuit connected to a heat source.

The invention also consists in a bakers' or like oven wherein the baking chamber is heated by Perkins or like tubes which project into a flue or flues forming part of a substantially closed circuit through which combustion gases from a heat source are circulated.

The oven is preferably provided with a chamber forming part of the closed circuit and opening to the exterior of the oven, the opening being available to alternative sources of heat.

The oven may comprise a swinging tray conveyor having a series of superposed laps between which flues are provided into which the ends of the Perkins or like tubes project, the circulating gases flowing through said flues in parallel.

The flues into which the Perkins tubes project are preferably disposed transversely of the oven and may be of increasing cross-sectional area in the direction in which the circulating gases flow. The Perkins tubes in each flue may be arranged to project progressively farther into the flues than the preceding tube in the direction of the gas circulation.

Figure 1:
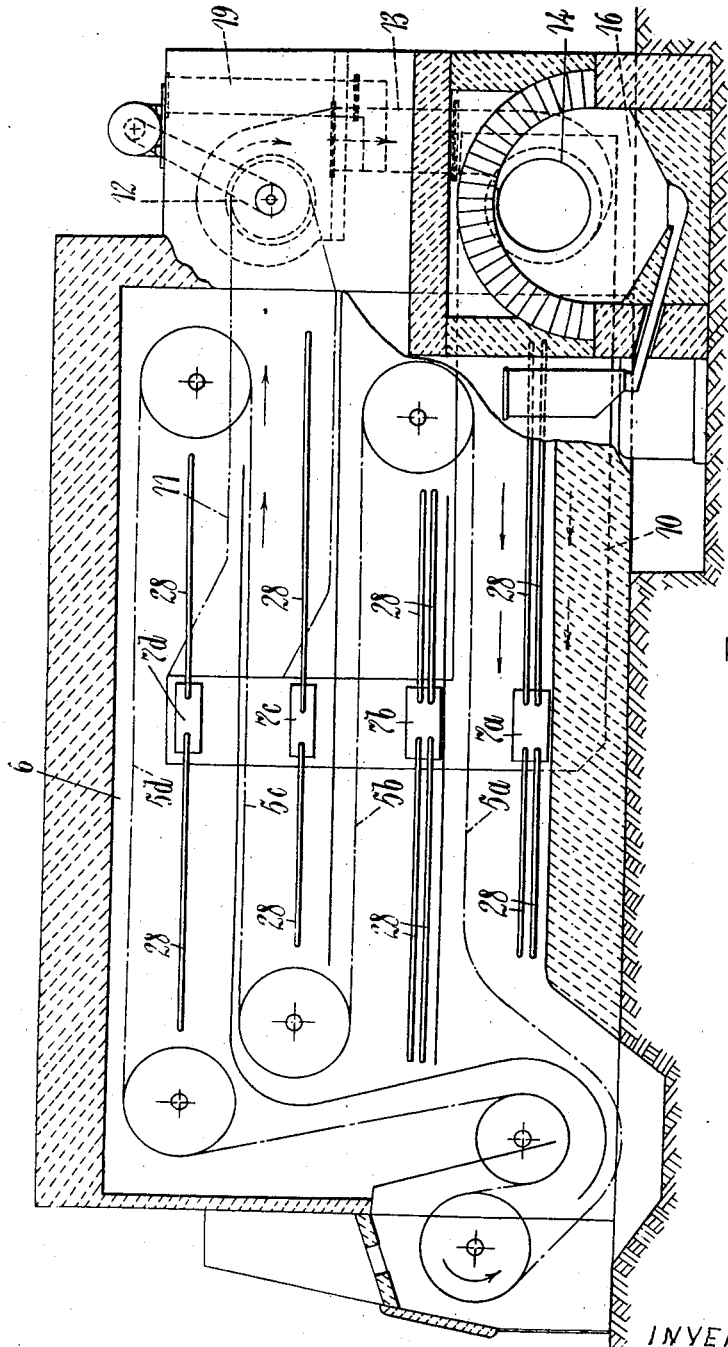
Figure 2:
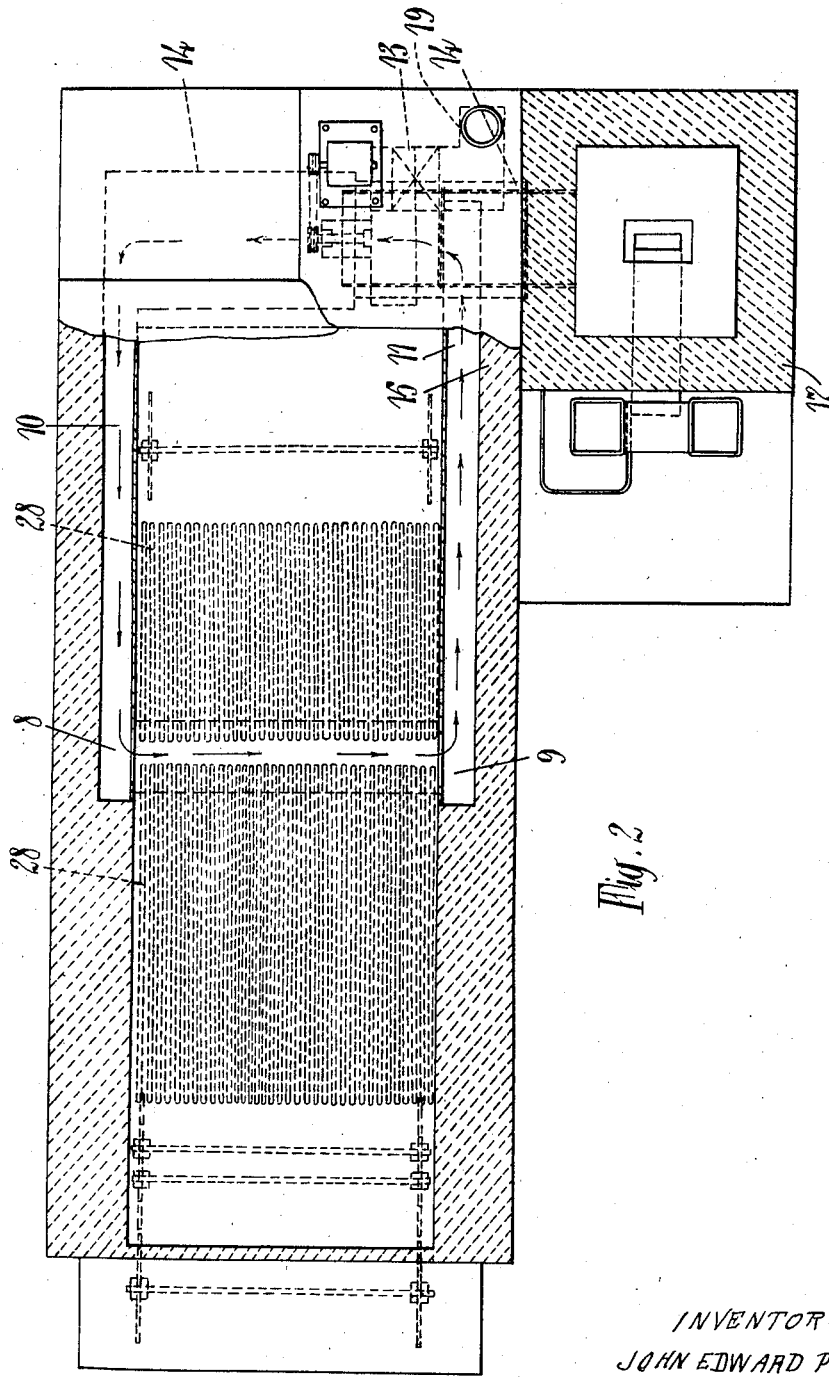
Figure 3:
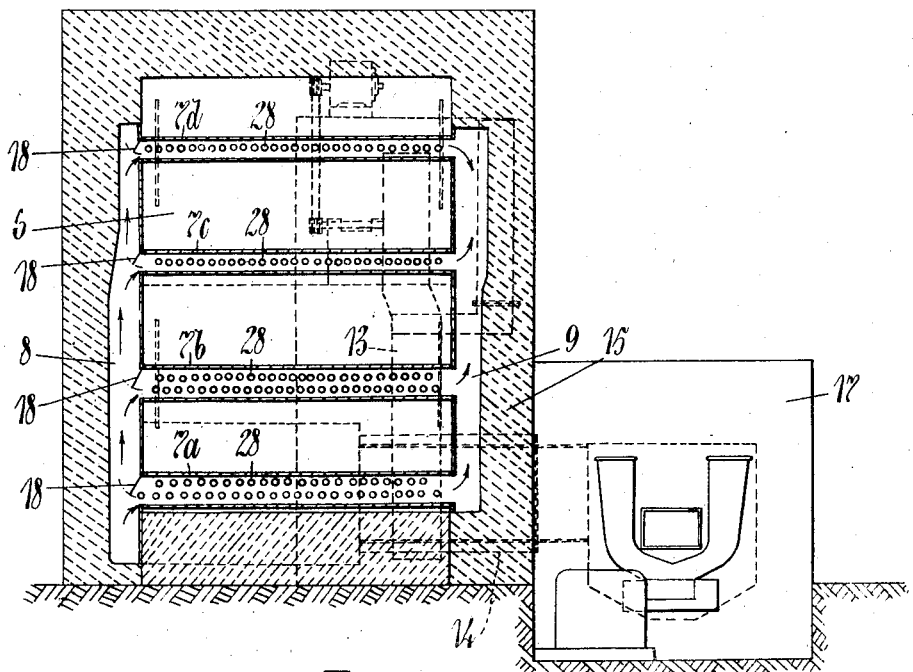

In the accompanying drawings which show the invention as applied to an endless pan conveyor oven as disclosed in United States Patent No. 1,942,974, issued to Pointon and Beanes January 9, 1934, Figure 1 is a longitudinal sectional elevation;
Figure 2 is a part-sectional plan view;
Figure 3 is a transverse sectional elevation of the oven chamber shown in Figures 1 and 2.

In carrying the invention into effect according to one convenient mode described by way of example as applied to a conveyor oven having, for instance, a number of horizontal laps $5a$, $5b$, $5c$, $5d$ of the conveyor 6 within the oven chamber, heating means are disposed midway according to the length of the oven chamber and comprise transverse flues $7a$, $7b$, $7c$, $7d$ for the reception of the ends of sets of Perkins tubes 28 extending thereinto from both directions. One flue $7a$ is arranged below the oven conveyor lap $5a$, another flue $7b$ is disposed between the laps $5a$, $5b$ of the conveyor, a third $7c$ is situated between the laps $5b$ and $5c$ while the fourth flue $7d$ is situated between the lap $5c$ and the return lap $5d$.

The transverse flues $7a$, $7b$, $7c$, $7d$ are connected at one side of the oven with a supply header or conduit 8 and on the other side with a collecting header or conduit 9. The headers 8 and 9 may be of varying cross-sectional area so that each transverse flue will be supplied with an adequate volume of heating gases.

The supply header 8 at its lower end is connected to a longitudinally extending supply flue 10 and the upper end of the collecting header 9 is connected to a return flue 11. This return flue is connected to the inlet of a circulating fan 12, the discharge of which is coupled by a downtake flue 13 with a transverse flue or chamber 14 which in turn is coupled to the supply flue 10.

The transverse flue or chamber 14 extends through a side wall 15 of the oven whereby it is connected to the combustion chamber or grate chamber 16 of an exterior furnace 17 by which the heating circuit is supplied with combustion gases.

It will be appreciated that with the construction at present concerned the flues or conduits supplying the heating flues $7a$, $7b$, $7c$ and $7d$ extend rearwardly of the oven, the furnace being located at one side of the oven while the chamber to which the combustion gases are supplied is located at the rear of the oven.

The combustion chamber 16 has a ring-shaped or rectangular tuyère grate for an underfeed stoker which is preferably as described in our British Patent specification No. 504,941, dated May 2, 1939. The arrangement for the solid fuel furnace may be such that the stoking passage or channel is parallel with the oven or at right angles thereto.

The inlet end of each transverse heating flue $7a$, $7b$, $7c$, $7d$ may be provided with a sliding or hinged damper or flap valve 18 or other means so that the proportion of gases which flows through each heating flue may be adjusted in order to regulate the top and bottom heat applied to the particular lap of the conveyor. As indicated these dampers 18 should be such that the flues 7a, 7b, 7c, 7d cannot be fully closed off.

At a suitable point in the system damper or valve means may be provided for by-passing an amount of the used heating gases out of the system proportional to the combustion gases introduced into the system by the heating source.

Thus a by-pass flue or vent 19 is coupled to the downtake flue 13, the by-pass flue being provided with a damper or valve.

Each of the transverse flues 7a, 7b, 7c, 7d may be of increasing cross-sectional area in plan in the direction of flow of the gases and in order to ensure a uniform quantity of the heat being conveyed by the circulating gases to the ends of all the Perkins tubes in each conduit the ends of the tubes may be arranged to project into the transverse flues to an amount increasing progressively or stepwise in the direction of the flow of the gases.

The furnace 17 or combustion chamber 16 thereof may be provided with means through which burners for pulverised fuel or an oil or gas burner installation may be introduced as a unit by projecting it into the furnace and supporting it therein.

Alternatively the burner devices may be mounted upon a structure mounted adjacent the opening in the wall of the oven so that the burners project through said opening, it being appreciated that in such case the solid fuel furnace is not in position.

Although the invention has been described above with reference to heating flues located midway in the length of an oven, it is to be understood that it may equally be applied to heating flues located at the end of an oven, in which case the Perkins tubes will extend the full length of the oven and project into the heating flues at the end wall.

Again, heating flues may be disposed at intervals along the oven, each set of flues being connected to a separate circulating circuit with its own heat source, or all sets of flues may be coupled in the one circulating system, suitable dampers being provided to ensure the desired flow of gases.

The invention may be applied to draw plate or other ovens in which Perkins or like tubes are used, in each case the heating medium for the Perkins tubes being combustion gases circulated in a substantially closed system by forced draught means, such system including a chamber or flue to which alternative heat source means may be applied.

We claim:

In a heating system for ovens wherein the baking chamber is heated by a plurality of elongated heat-conductive radiating elements, in combination, a flue closed off from the baking chamber and into which said radiating elements extend for a minor portion of their length, a furnace outside of said baking chamber, ducts connecting said furnace and flue in a continuous closed circuit, means for circulating hot products of combustion from said furnace through said circuit, and means for venting off a suitable portion of said gases from the circuit.

JOHN EDWARD POINTON.
CLAUDE DUMBLETON.